United States Patent
Shichijo et al.

[11] Patent Number: 6,121,385
[45] Date of Patent: Sep. 19, 2000

[54] RUBBER-MODIFIED STYRENIC RESIN COMPOSITION

[75] Inventors: Yasuji Shichijo; Jing Hui Chen; Keiichi Hayashi, all of Kisarazu; Shigeru Owada, Kyoto; Isao Tanaka, Kawasaki; Kiichi Kometani, Yokohama, all of Japan

[73] Assignee: Nippon Steel Chemical Co., Ltd., Tokyo, Japan

[21] Appl. No.: 09/180,857

[22] PCT Filed: May 16, 1997

[86] PCT No.: PCT/JP97/01663

§ 371 Date: Nov. 17, 1998

§ 102(e) Date: Nov. 17, 1998

[87] PCT Pub. No.: WO97/44892

PCT Pub. Date: Nov. 27, 1997

[30] Foreign Application Priority Data

May 17, 1996 [JP] Japan ..................................... 8-122918

[51] Int. Cl.[7] .................................................. C08L 33/06
[52] U.S. Cl. ........................... 525/227; 525/232; 525/240; 525/241
[58] Field of Search ..................................... 525/227, 232, 525/240, 241

[56] References Cited

U.S. PATENT DOCUMENTS

| | | | |
|---|---|---|---|
| 5,075,376 | 12/1991 | Furuta et al. ............................... | 525/68 |
| 5,534,590 | 7/1996 | Horiie ....................................... | 525/71 |
| 5,852,124 | 12/1998 | Wang et al. .............................. | 525/316 |
| 5,891,962 | 4/1999 | Otsuzuki et al. ........................ | 525/316 |

FOREIGN PATENT DOCUMENTS

| | | |
|---|---|---|
| 62-39610 | 2/1978 | Japan . |
| 62-39610 | 2/1987 | Japan . |
| 64-62344 | 3/1989 | Japan . |
| 4-126756 | 4/1992 | Japan . |
| 4126756 | 4/1992 | Japan . |
| 4-320441 | 11/1992 | Japan . |
| 4320441 | 11/1992 | Japan . |
| 5-179089 | 7/1993 | Japan . |
| 5179089 | 7/1993 | Japan . |
| 5-279547 | 10/1993 | Japan . |
| 5279547 | 10/1993 | Japan . |
| 625507 | 2/1994 | Japan . |
| 6157863 | 6/1994 | Japan . |

*Primary Examiner*—Margaret G. Moore
*Attorney, Agent, or Firm*—Birch, Stewart, Kolasch & Birch, LLP

[57] ABSTRACT

Rubber-modified styrenic resin compositions of this invention comprise 90 to 30% by weight of rubber-modified styrenic resins (A) containing rubbery polymers dispersed with an average particle diameter of 0.3 to 2.0 μm in the phase of styrenic polymers (C) and 10 to 70% by weight of styrene-(meth)acrylate ester copolymer resins (B) and, in said compositions, the content of (meth)acrylate ester units is 5 to 50% by weight and the toluene-insolubles (% by weight: X) and the rubber component (% by weight: Y) are present at a ratio (X/Y) in the range from 1.2 to 3.5. The compositions excel in appearance, scratch resistance, impact resistance and rigidity and are easy to fabricate.

4 Claims, No Drawings

RUBBER-MODIFIED STYRENIC RESIN COMPOSITION

This application is the national phase under 35 U.S.C. §371 of prior PCT International Application No. PCT/JP97/01663 which has an International filing date of May 16, 1997 which designated the United States of America, the entire contents of which are hereby incorporated by reference.

FIELD OF TECHNOLOGY

This invention relates to rubber-modified styrenic resin compositions formulated by mixing rubber-modified styrenic resins containing rubbery polymers as dispersed particles and rubbery polymer-free styrene-(meth) acrylate ester copolymer resins at a specified ratio and, more particularly, to rubber-modified styrenic resin compositions of excellent surface appearance and scratch resistance with a good balance of impact resistance and rigidity.

BACKGROUND TECHNOLOGY

On account of their excellence in a variety of characteristics such as impact resistance and fabricability, rubber-modified styrenic resins (HIPS) are used extensively in electrical, electronic, office and communication equipment. In recent years, there is a tendency to omit coating of the surface of molded articles from the viewpoint of more efficient recycling of molding materials and this has created a strong demand for improvement of surface characteristics such as appearance and scratch resistance.

The impact resistance of HIPS is obtained by dispersing particles of rubbery polymers in styrenic resins. The rubber particles, however, are responsible not only for the uneven surface of molded articles but also for lowered gloss and scratch resistance and thus disqualify HIPS for application to end uses requiring good surface appearance and scratch resistance. A number of methods, for example, size reduction of rubber particles and control of particle size distribution, have been proposed to improve the aforementioned surface characteristics of articles molded from HIPS. These methods, however, do not produce a good balance of impact resistance, rigidity and surface appearance and, in addition, present a critical problem of fundamental difficulty in imparting scratch resistance to the surface of molded articles.

On the other hand, addition of lubricants such as polysiloxanes for improving the slipperiness of the surface has been proposed as a means for improving the scratch resistance of the surface of molded articles. This method is not always sufficiently effective for improving the scratch resistance and the additives thereby incorporated tend to produce poor surface appearance and stain molds. Compounding scratch-resistant materials such as methacrylic resins with ABS resins is also known as a means to improve simultaneously impact resistance, surface appearance and scratch resistance. The resulting formulations, however, suffer marked deterioration of fabricability.

Japan Kokai Tokkyo Koho No. Hei 6-25507 (1994) discloses rubber-modified styrenic resin compositions (rubber-reinforced methacrylate-styrene copolymer resin compositions) containing rubbery elastomers as dispersed particles and copolymers of styrenic monomers and (meth) acrylate monomers as continuous phase and showing excellent appearance and other surface characteristics. This method, however, necessitates copolymerization of a large quantity of (meth)acrylate monomers for sufficient improvement of the surface characteristics, in particular, scratch resistance and eventually leads to deterioration of fabricability. In order to maintain the fabricability, it becomes necessary to control the glass transition temperature of the matrix phase and, in turn, it becomes necessary to additionally copolymerize butyl acrylate. The overall result is lowered heat resistance, narrower latitude in practical use of molded articles and higher cost.

In an attempt to solve these problems, Japan Kokai Tokkyo Koho No. Hei 6-157863 (1994) discloses a method which comprises mixing the aforementioned rubber-reinforced methacrylate-styrene copolymer resins and HIPS at a specified ratio and utilizing the mixture. This method, however, is not very effective for improving the scratch resistance and manifesting high rigidity because the rubbery elastomers are dispersed as particles in the methacrylate-styrene copolymer resins.

As described above, there is a demand for development of rubber-modified styrenic resin compositions with good fabricability and surface characteristics such as appearance and scratch resistance and additionally with a good balance of impact resistance and rigidity.

The present inventors have conducted extensive studies to meet such a demand, found that the aforementioned problems can be solved by mixing specified rubber-modified styrenic resins and rubber-free styrene-(meth) acrylate ester copolymer resins at a specified ratio and completed this invention.

Accordingly, an object of this invention is to provide rubber-modified styrenic resin compositions of good fabricability with excellent surface characteristics such as appearance and scratch resistance and high impact resistance and rigidity.

DISCLOSURE OF THE INVENTION

This invention relates to rubber-modified styrenic resin compositions comprising 90 to 30% by weight of rubber-modified styrenic resins (A) containing rubbery polymers in a dispersed state with an average particle diameter of 0.3 to 2.0 $\mu$m and 10 to 70% by weight of styrene-(meth)acrylate ester copolymer resins (B), wherein the content of (meth)acrylate ester units is 5 to 50% by weight and the toluene-insolubles (% by weight: X) and the rubber component (% by weight: Y) are present at a ratio (X/Y) in the range from 1.2 to 3.5.

Rubber-modified styrenic resin composition of this invention will be described in detail below.

Rubber-modified styrenic resins (A) constituting rubber-modified styrenic resin compositions of this invention are obtained by polymerizing styrenic monomers in the presence of rubbery polymers while styrene-(meth)acrylate ester copolymer resins (B) are obtained by copolymerizing styrenic monomers and (meth)acrylate ester monomers.

The styrenic monomers in this invention include styrene, αmethylstyrene and p-methylstyrene and styrene is used advantageously on account of its low price. These styrenic monomers may be used singly or as a mixture of two kinds or more.

The (meth)acrylate ester monomers in this invention include methyl methacrylate, ethyl methacrylate, methyl acrylate and ethyl acrylate and methyl methacrylate is used advantageously for ease of control of its polymerization and for its effectiveness for improving scratch resistance and rigidity. They are used either singly or as a mixture of two kinds or more.

Rubbery polymers to be dispersed as particles in rubber-modified styrenic resins (A) of this invention may be any substance which exhibits rubbery properties at normal temperature; for example, polybutadiene, styrene-butadiene copolymers, styrene-butadiene block copolymers, hydrogenated (or partially hydrogenated) polybutadiene, hydrogenated (or partially hydrogenated) styrene-butadiene copolymers, hydrogenated (or partially hydrogenated) styrene-butadiene block copolymers, ethylene-propylene copolymers, ethylene-propylene-unconjugated diene terpolymers, isoprene polymers and styrene-isoprene copolymers.

In rubber-modified styrene resin compositions of this invention, the ratio of rubber-modified styrenic polymers (A) to styrene-(meth)acrylate ester copolymer resins (B) must be chosen to formulate compositions of good fabricability with a good balance of surface characteristics such as appearance and scratch resistance, impact resistance and rigidity and, in consequence, it is necessary to mix the A component in the range from 90 to 30% by weight and the B component in the range from 10 to 70% by weight. It is particularly desirable to mix the A component in the range from 75 to 40% by weight and the B component in the range from 25 to 60% by weight. Compositions with more than 90% by weight of the A component deteriorate not only in rigidity such as flexural modulus but also in surface appearance and scratch resistance. On the other hand, compositions with less than 30% by weight of the A component lack sufficient impact resistance and show poor fabricability.

In styrenic resin compositions of this invention, the dispersed particles of rubbery polymers originating in rubber-modified styrenic resins (A) are required to have an average particle diameter in the range from 0.3 to 2.0 $\mu$m, preferably from 0.4 to 1.5 $\mu$m, and more preferably from 0.4 to 0.9 $\mu$m. An average particle diameter of less than 0.3 $\mu$m yields insufficient impact resistance while one in excess of 2.0 $\mu$m causes marked deterioration of surface appearance such as gloss.

The average particle diameter here is determined as follows: a test specimen prepared from resins by osmium tetroxide staining and ultrathin sectioning is photographed in 10,000 magnifications by an electron microscope, the diameter of 1,000 or more dispersed rubber particles is measured off the electron micrograph, and the average particle diameter is calculated by the following equation;

Average particle diameter=$\Sigma n_i D_i^4 / \Sigma n_i D_i^3$ wherein $n_i$ designates the number of rubbery polymer particles with a particle diameter of $D_i$.

In rubber-modified styrenic resin compositions of this invention, the quantity of (meth)acrylate ester units must be in the range from 5 to 50% by weight, preferably from 5 to 30% by weight, in order to keep both scratch resistance and rigidity at an acceptable level. The scratch resistance does not improve sufficiently with less than 5% by weight of (meth)acrylate ester units while the fabricability deteriorates with more than 50% by weight.

In order to obtain a satisfactory balance of properties in respect to gloss, impact resistance and rigidity according to this invention, the toluene-insolubles (% by weight: X) and the rubber component (% by weight: Y) contained in the resin compositions need to be present at a ratio (X/Y) in the range from 1.2 to 3.5, preferably from 1.2 to 3.0, more preferably from 1.2 to 2.5. The impact resistance deteriorates markedly when the ratio (X/Y) is less than 1.2 and the rigidity represented by flexural modulus decreases sharply when the ratio (X/Y) exceeds 3.5; a satisfactory balance of properties cannot be obtained when the ratio is outside the specified range.

Satisfactory balancing of scratch resistance and impact resistance in rubber-modified styrenic resin compositions of this invention requires that styrenic polymers (C) constituting the continuous phase of rubber-modified styrenic resins (A) on the one hand and styrene-(meth)acrylate ester copolymer resins (B) on the other are dispersed in a semi-compatible state. The compatibility of the two phases can be tested easily by a known procedure, for example, by staining a specimen selectively by two-step staining with osmium oxide and ruthenium oxide and observing the specimen by a transmission electron microscope [for example, J. S. Trent, J. 1. Scheinbeim and P. R. Couchman, Macromolecules, 16, 589 (1983)]. The average length of the interface between the phase of the aforementioned styrenic polymers (C) and that of styrene-(meth)acrylate ester copolymer resins (B) in said resin compositions is preferably 2.5 $\mu$m or more, more preferably 3.0 $\mu$m or more, per 1 square $\mu$m. An average length of interface shorter than 2.5 $\mu$m does not make the two phases sufficiently compatible and results in marked deterioration of impact resistance.

According to this invention, it is allowable to add 0.005 to 0.5% by weight of polysiloxanes with a surface tension at 25° C. of 25 dynes/cm or less, preferably 19.0 to 22.0 dynes/cm, more preferably 19.8 to 21.5 dynes/cm, and/or 0.001 to 0.5% by weight of fluorine compounds with a surface tension at 25° C. of 30 dynes/cm or less to the rubber-modified styrenic resin compositions. Addition of such polysiloxanes and fluorine compounds helps to attain a further improved balance of surface appearance, impact resistance and rigidity. In particular, polysiloxanes with a surface tension in the preferable range of 19.0 to 22.0 dynes/cm or in the more preferable range of 19.8 to 21.5 dynes/cm at 25° C. exhibit optimal dispersion in resins and produce a marked effect for improving the impact resistance.

Polysiloxanes of this kind are those showing a viscosity of 10 to 1,000 centistokes at 25° C., although no specific restriction is imposed on the viscosity, and containing a repeating structural unit represented by the general formula

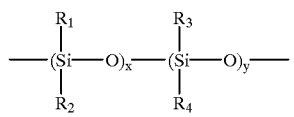

wherein $R_1$, $R_2$, $R_3$ and $R_4$ designate organic groups such as alkyl, phenyl and aralkyl.

Polysiloxanes useful for this invention are exemplified by dimethylpolysiloxanes, methylphenylpolysiloxanes and methylethylpolysilo xanes and they are used either singly or as a mixture of two kinds or more.

According to this invention, the surface characteristics such as appearance and scratch resistance, the impact resistance and the rigidity will be balanced better when the dispersed particles of rubbery polymers originating in the A component show an average particle diameter in the range from 0.4 to 0.9 $\mu$m and, morphologically, the proportion of dispersed particles of a salami-like structure is 80% or more of the total dispersed rubbery polymer particles and the number of dispersed particles each occluding 20 or less styrenic polymer particles is 70% or more of the total number of dispersed particles.

The dispersed particles of a salami-like structure here refer to the dispersed rubbery polymer particles each of which occludes 2 or more styrenic polymer particles. The occluded styrenic polymer particles refer to those which are occluded in the dispersed rubbery polymer particles and measure 0.3 mm (that is, 0.03 μm in actual size) or more in short diameter in an electron micrograph of 10,000 magnifications of the ultrathin section of a rubber-modified styrenic rubber composition.

The proportion of the rubbery polymers originating in rubber-modified styrenic resins (A) in rubber-modified styrenic resin compositions of this invention is not restricted in any specified manner and it is preferably in the range from 2 to 20% by weight, more preferably from 3 to 15% by weight, to produce high impact resistance.

Rubber-modified styrenic resin compositions of this invention are prepared as follows.

Rubber-modified styrenic resins (A) containing rubbery polymers as dispersed particles are prepared by a method such as rubbery polymers are dissolved in a raw material solution consisting of either styrenic monomers or, as needed, a mixture of styrenic monomers, a polymerization solvent and a polymerization initiator and the resulting feedstock is polymerized in an agitated reactor in the presence or absence of a common radical catalyst. The polymerization temperature is determined in consideration of the flow of rubber-modified styrenic resins, productivity and the heat-removing capacity of the reactor. The particle diameter of rubbery polymers dispersed in rubber-modified styrenic resins (A) is controlled by a method such as by control of the speed of agitation. After completion of the polymerization, the reaction mixture is devolatilized under vacuum to remove the unreacted monomers, the solvent and the like to yield rubber-modified styrenic resins (A).

Rubbery polymer-free styrene-(meth)acrylate ester copolymer resins (B) of this invention can be prepared by a known method. Styrenic monomers are mixed with (meth) acrylate ester monomers, a polymerization solvent is added if necessary and the mixture is subjected to suspension polymerization, mass polymerization, solution polymerization or mass-suspension polymerization in the presence or absence of a common radical catalyst batchwise, continuously or by a combination of batch and continuous processes. After completion of the polymerization, the reaction mixture is devolatilized under vacuum to remove the unreacted monomers, the solvent and the like to yield rubbery polymer-free styrene-(meth)acrylate ester copolymer resins (B).

The rubber-modified styrenic resins (A) and the styrene-(meth) acrylate ester copolymer resins (B) thus prepared are mixed at a specified ratio. There is no specific restriction on the mixing process and a known process is used; for example, one process melts and blends the two resins in an extruder and another process blends pellets of the two resins and melt-blends in a molding machine to yield molded products. A special process may also be adopted; one of the two resins is added to the other while the other is melted or dissolved.

The addition of polysiloxanes and fluorine compounds to rubber-modified styrenic resin compositions of this invention may be made at any stage in the preparation of the compositions. For example, the additives may be added to one or both of the A and B components in the course of their preparation and, in such a case, the additives may be added to the feedstock prior to its polymerization, to the polymerization solution midway in the polymerization step or to the granulating step after completion of the polymerization. Alternatively, the additives may be added to the mixing step of the prepared A and B components. Another possibility is to prepare master pellets from polysiloxanes and styrenic resins or rubber-modified styrenic resins with a high concentration of polysiloxanes and add the master pellets to the components A and B in a blender or a molding machine.

The rubber-modified styrenic resin compositions thus prepared according to this invention are applied as they are advantageously to those end uses where HIPS and ABS resins are used widely. It is possible, as needed, to add to the compositions a variety of additives commonly used for HIPS resins, for example, antioxidants, heat stabilizers, light stabilizers, flame retardants, nonionic surfactants, anionic surfactants and lubricants [liquid paraffin, higher fatty acids, metal salts of higher fatty acids, ethylenebis(fatty acid) amides, and dibutyl or dioctyl esters of adipic and sebacic acids].

Rubber-modified styrenic resin compositions of this invention are especially suited for injection molding materials and the articles molded therefrom can be used without coating because of their excellent surface appearance and scratch resistance. The articles molded from resin compositions of this invention exhibit better platability with metals than the conventional HIPS and a metal film can be formed easily with high adhesive strength on the surface of molded articles, thereby giving not only a decorative effect but also industrially useful characteristics (for example, mechanical, electrical, optical, thermal, physical or chemical characteristics). As to the process for plating with metals, chemical plating (electroless plating) or vacuum deposition may be adopted similarly to the plating of articles molded from ABS and other plastics. According to the chemical plating (electroless plating) process, a molded article is coated uniformly with a metal on its surface by adding a reducing agent (sodium hypophosphite, sodium borohydride and so on) to an aqueous solution containing ions of nickel, cobalt and copper and heating the article in the mixture at 90 to 100° C. In this case, It is desirable to roughen the surface chemically by pretreating with an etchant based on sulfuric acid/chromic acid. Plating by the vapor deposition process is effected readily by heating a metal in a high vacuum of $10^{-4}$ to $10^{-5}$ mmHg and allowing the metal vapor to deposit on the surface of a molded article.

PREFERRED EMBODIMENT OF THE INVENTION

This invention will be described in detail below with reference to examples and comparative examples, but will not be limited in any way by these examples and comparative examples.

The following are the test methods for a variety of properties adopted in the examples and comparative examples of this invention.

(1) Determination of diameter and morphology of rubber particles

A rubber-modified styrenic resin composition is stained with osmium tetroxide, the stained composition is formed into a test specimen by ultrathin sectioning, the test specimen is photographed by an electron microscope of 10,000 magnifications, and 1,000 or more dispersed rubber particles in the magnified photograph are measured for their particle diameter and ① average particle diameter, ② proportion of rubber particles of a salami-like structure and ③ proportion of dispersed rubber particles occluding 20 or less styrenic polymer particles (proportion of particles with 20 or less occluded particles) are calculated according to the following equations:

① Average particle diameter $(\mu m) = \Sigma n_i D_i^4 \div \Sigma n_i D_i^3$,

② Proportion of rubber particles of a salami-like structure (% by weight) $= \Sigma m_i D_i^3 \div \Sigma n_i D_i^3$, and ③ Proportion of particles with 20 or less occluded particles=$\Sigma i_k \div \Sigma n_i$ wherein $n_i$ designates the number of rubbery polymer particles with a particle diameter of $D_i$, $m_i$ designates the number of rubber particles of a salami-like structure with a particle diameter of $D_i$, $i_k$ designates the number of particles with 20 or less occluded particles and the occluded styrenic polymer particles refer to those which are occluded in the dispersed rubbery polymer particles and measure 0.3 mm (that is, 0.03 μm in actual size) or more in short diameter in an electron micrograph of 10,000 magnifications.

(2) Content of (meth)acrylate ester units

A specimen of rubber-modified styrenic resin compositions or styrenic copolymer resins (B) is dissolved in methyl ethyl ketone and reprecipitated with methanol. The precipitate is collected by filtration, dried thoroughly, submitted to elemental analysis and the oxygen content thereby found is used to calculate the content of (meth)acrylate ester units.

(3) Toluene-insolubles (TI)

One gram (1 g) of a rubber-modified styrenic resin composition is dissolved in 30 ml of toluene, the solution is subjected to centrifugal sedimentation in a centrifuge equipped with a rotor measuring 11.4 cm in radius (H-2000B manufactured by Kokusan Enshinki Kabushiki Kaisha) at 14,000 rpm and 20° C. for 30 minutes, the supernatant liquid is removed, the insoluble matters are separated, dried to remove the toluene, and weighed and the content of toluene-insolubles is calculated as follows;

Toluene-insolubles (% by weight)=[(weight of toluene-insolubles)/(weight of resin composition)]×100

(4) Average length of interface

A selectively stained specimen prepared by osmium tetroxide staining, ultrathin sectioning and ruthenium tetroxide staining is photographed in 10,000 magnifications by a transmission electron microscope and the length of the interface between the stained phase of styrenic polymers (C) and the unstained phase of styrene-(meth)acrylate ester copolymer resins (B) (length of interface) in the photograph is measured. The length of portions whose length of interface is 1 μm or more is added up over 10 photographs of 90 mm by 140 mm and the average length of interface per 1 square μm is calculated.

(5) Quantity of rubber component: the Wijs method.
(6) Izod impact strength: JIS K6871 (notched).
(7) Flexural modulus: ASTM D-790.
(8) Gloss: JIS K7105.
(9) Image clarity: JIS K7105.
(10) Pencil hardness: JIS K5400.

EXAMPLES 1 TO 3

(a) Preparation of rubber-modified styrenic resins (A)

A feedstock was prepared by adding 22 parts by weight of ethylbenzene and 0.015 part by weight of di-tertiarybutylperoxycyclohexane to 100 parts by weight of a mixture of 90 parts by weight of styrene and 10 parts by weight of low-cis polybutadiene rubber. The feedstock was supplied continuously at a constant rate to a first reactor which is a complete mixing type tank, allowed to polymerize at 110° C., then supplied in whole continuously to a second reactor which is a plug flow type agitated tower and allowed to polymerize.

The temperature at the outlet of the second reactor was controlled at 140° C. and the agitator speed was set at 150 rpm in the first reactor and 100 rpm in the second reactor.

The rubbery polymers were not yet dispersed into particles at the outlet of the first reactor. The polymerization advanced with agitation in the second reactor and the polymerizate at the outlet of the second reactor showed that the rubbery polymers completed their dispersion into particles.

The entire polymerizate coming out of the second reactor was fed continuously to a reactor which is a plug flow type static mixer and allowed to polymerize until the conversion of the styrene reached 85% while the polymerization temperature was controlled in such a manner as to generate a temperature gradient inside the reactor and maintain the outlet temperature at 160° C.

The polymerizate thus obtained was devolatilized under reduced pressure to remove volatile components, mixed with 0.1 part by weight of liquid paraffin and pelletized. Rubber-modified styrenic resins (A) thus prepared showed an average rubber particle diameter of 1.1 μm and a ratio of toluene-insolubles to rubber component of 2.8.

(b) Preparation of styrene-(meth)acrylate ester copolymer resins (B)

A feedstock was prepared by adding 10 parts by weight of ethylbenzene to 100 parts by weight of a mixture of 70 parts by weight of styrene and 30 parts by weight of methyl methacrylate (MMA). The feedstock was supplied continuously at a constant rate to the first complete mixing type tank reactor and allowed to polymerize at 140° C. The conversion of the polymerizate discharged from the reactor was 74%.

The polymerizate was devolatilized under reduced pressure to remove volatile components and pelletized to yield styrene-methyl methacrylate copolymer resins (B) containing 33% by weight of methyl methacrylate (MMA) units.

(c) Preparation of rubber-modified styrenic resin compositions

Two kinds of pellets obtained by the aforementioned procedures (a) and (b) were mixed at ratios A/B of 70/30, 50/50 and 30/70 and 100 parts by weight each of the mixtures was mixed with 0.05 part by weight of dimethylpolysiloxanes showing a surface tension of 20.6 dynes/cm at 25° C. and blended and pelletized in a twin-screw extruder to yield the desired rubber-modified styrenic resin compositions, which were tested for their properties.

Table 1 shows the contents of A, B and polysiloxanes, average rubber particle diameter, contents of MMA in total resins and B, and properties for the rubber-modified styrenic resin compositions obtained in Examples 1 to 3.

Comparative Examples 1 to 4

The A and B components prepared in Example 1 were mixed at the ratios shown in Table 1 (100/0, 95/5, 20/80 and 0/100) and processed as in Example 1 to yield rubber-modified styrenic resin compositions of Comparative Examples 1 to 4.

Table 1 shows the contents of A, B and polysiloxanes, average rubber particle diameter, contents of MMA in total resins and B, and properties for the rubber-modified styrenic resin compositions obtained in Comparative Examples 1 to 4.

EXAMPLE 4

Rubber-modified styrenic resins (A) were prepared and pelletized as in Example 1 except setting the agitation speed of the second reactor at 150 rpm.

The A component thus obtained showed the following properties: the average rubber particle diameter was 0.6 μm, the ratio of toluene-insolubles to rubber component was 1.8, the proportion of rubber particles of a salami-like structure was 96% and the proportion of rubber particles with 20 or less occluded styrenic polymer particles was 94%.

Fifty parts by weight of the A component was mixed with 50 parts by weight of the B component, the same as used in Example 1, further mixed with 0.05 part by weight of dimethylpolysiloxanes, and blended and pelletized in a twin-screw extruder to give the desired rubber-modified styrenic resin composition of Example 4.

Table 1 shows the contents of A, B and polysiloxanes, average rubber particle diameter, contents of MMA in total resins and B, and properties for the rubber-modified styrenic resin composition of Example 4.

Comparative Example 5

Rubber-modified styrenic resins (A) were prepared and pelletized as in Example 1 except setting the agitation speed of the second reactor at 500 rpm.

The A component thus obtained showed the following properties: the average rubber particle diameter was 0.2 μm, the ratio of toluene-insolubles to rubber component was 1.6, the proportion of rubber particles of a salami-like structure was 54% and the proportion of rubber particles with 20 or less occluded styrenic polymer particles was 98%.

Fifty parts by weight of the A component was mixed with 50 parts by weight of the B component, the same as used in Example 1, and blended and pelletized in a twin-screw extruder to give the rubber-modified styrenic resin composition of Comparative Example 5.

Table 1 shows the contents of A, B and polysiloxanes, average rubber particle diameter, contents of MMA in total resins and B, and properties for the rubber-modified styrenic resin composition of Comparative Example 5.

Comparative Example 6

Rubber-modified styrenic resins (A) were prepared and pelletized as in Example 1 except setting the agitation speed of the second reactor at 50 rpm. The A component thus obtained showed an average rubber particle diameter of 2.7 μm.

Fifty parts by weight of the A component was mixed with 50 parts by weight of the B component, the same as used in Example 1, and blended and pelletized in a twin-screw extruder to give the rubber-modified styrenic resin composition of Comparative Example 6.

Table 1 shows the contents of A, B and polysiloxanes, average rubber particle diameter, contents of MMA in total resins and B, and properties for the rubber-modified styrenic resin composition of Comparative Example 6.

Comparative Example 7

Rubber-modified styrenic resins (A) were prepared and pelletized as in Example 1 except changing the quantity of di-tertiarybutylperoxycycl ohexane to 0.05 part by weight. The A component thus obtained showed an average rubber particle diameter of 1.0 μm.

Fifty parts by weight of the A component was mixed with 50 parts by weight of the B component, the same as used in Example 1, and blended and pelletized in a twin-screw extruder to give the rubber-modified styrenic resin composition of Comparative Example 7.

Table 1 shows the contents of A, B and polysiloxanes, average rubber particle diameter, contents of MMA in total resins and B, and properties for the rubber-modified styrenic resin composition of Comparative Example 7.

Comparative Example 8

Rubber-modified styrenic resins (A) were prepared and pelletized as in Example 1 except changing the rubber component to high-cis polybutadiene rubber and omitting the addition of di-tertiarybutylperox ycyclohexane. The A component thus obtained showed the following properties: the average rubber particle diameter was 0.7 μm, the ratio of toluene-insolubles to rubber component was 1.1, the proportion of rubber particles of a salami-like structure was 62% and the proportion of rubber particles with 20 or less occluded styrenic polymer particles was 90%.

Styrene-(meth)acrylate ester copolymer resins (B) were prepared as in Example 1 except using a feedstock containing 40 parts by weight of styrene and 60 parts by weight of methyl methacrylate. The conversion of the polymerizate discharged from the reactor was 70% and the B component thus obtained contained 65% by weight of MMA units.

Fifty parts by weight of the A component and 50 parts by weight of the B component were blended and pelletized in a twin-screw extruder to give the rubber-modified styrenic resin composition of Comparative Example 8.

Table 1 shows the contents of A, B and polysiloxanes, average rubber particle diameter, contents of MMA in total resins and B, and properties for the rubber-modified styrenic resin composition of Comparative Example 8.

Comparative Example 9

The rubber-modified styrenic resin composition of Comparative Example 9 was prepared from the A component of Example 4 alone. Table 1 shows the contents of A, B and polysiloxanes, average rubber particle diameter, contents of MMA in total resins and B, and properties for the rubber-modified styrenic resin composition of Comparative Example 9.

Comparative Example 10

Styrene-(meth)acrylate ester copolymer resins (B) were prepared as in Example 1 except using a feedstock containing 20 parts by weight of styrene and 80 parts by weight of methyl methacrylate. The conversion of the polymerizate discharged from the reactor was 65% and the B component thus obtained contained 82% by weight of MMA units.

Seventy parts by weight of the B component thus obtained was added to 30 parts by weight of the A component of Example 1 and the mixture was blended and pelletized in a twin-screw extruder to give the desired rubber-modified styrenic resin composition of Comparative Example 10.

Table 1 shows the contents of A, B and polysiloxanes, average rubber particle diameter, contents of MMA in total resins and B, and properties for the rubber-modified styrenic resin composition of Comparative Example 10.

EXAMPLES 5 TO 8 AND COMPARATIVE EXAMPLES 11 to 15

The A and B components shown in Table 1 were prepared as in Example 1 and used as in Example 1 to give the rubber-modified styrenic resin compositions of Examples 5 to 8 and Comparative Examples 11 to 15. In the preparation of A components, the A components having the average rubber particle diameter of 0.58 μm were prepared under the agitater speed of 150 rpm in the second reactor, and the A component having the average rubber particle diameter of 2.7 μm was prepared under the agitater speed of 50 rpm in the second reactor.

Table 1 shows the contents of A, B and polysiloxanes, average rubber particle diameter, contents of MMA in total resins and B, and properties for the rubber-modified styrenic resin composition of Examples 5 to 8 and Comparative Examples 11 to 15.

TABLE 1

| | Comparative example | | Example | | |
|---|---|---|---|---|---|
| | 1 | 2 | 1 | 2 | 3 |
| Content of A component (wt %) | 100 | 95 | 70 | 50 | 30 |
| Content of B component (wt %) | — | 5 | 30 | 50 | 70 |
| Content of polysiloxanes (wt %) | — | 0.05 | 0.05 | 0.05 | 0.05 |
| Average rubber particle diameter ($\mu_m$) | 1.1 | 1.1 | 1.1 | 1.1 | 1.1 |
| Content of MMA in total resins (wt %) | — | 1.7 | 9.9 | 16.5 | 23.1 |
| Content of MMA in B component (wt %) | — | 33 | 33 | 33 | 33 |
| TI/rubber component | 2.8 | 2.8 | 2.8 | 2.8 | 2.8 |
| Average length of interface ($\mu_m/\mu_m^2$) | — | 0.7 | 4.2 | 7.1 | 4.1 |
| Izod impact strength (kgfcm/cm) | 4.5 | 12.5 | 10.5 | 7.6 | 5.3 |
| Flexural modulus (kgf/cm²) | 190 | 195 | 216 | 238 | 260 |
| Gloss (%) | 91 | 91 | 94 | 95 | 97 |
| Image clarity (%) | 66.0 | 66.0 | 73.0 | 78.0 | 83.0 |
| Pencil hardness | 4B-3B | 3B | HB | F | F-H |

| | Comparative example | Example | Comparative example | |
|---|---|---|---|---|---|
| | 3 | 4 | 4 | 5 | 6 |
| Content of A component (wt %) | 20 | — | 50 | 50 | 50 |
| Content of B component (wt %) | 80 | 100 | 50 | 50 | 50 |
| Content of polysiloxanes (wt %) | 0.05 | — | 0.05 | 0.05 | — |
| Average rubber particle diameter ($\mu_m$) | 1.1 | — | 0.6 | 0.2 | 2.7 |
| Content of MMA in total resins (wt %) | 26.4 | 33 | 16.5 | 16.5 | 16.5 |
| Content of MMA in B component (wt %) | 33 | 33 | 33 | 33 | 33 |
| TI/rubber component | 2.8 | — | 1.8 | 1.6 | 2.9 |
| Average length of interface ($\mu_m/\mu_m^2$) | 2.8 | — | 7.2 | 7 | 7.1 |
| Izod impact strength (kgfcm/cm) | 2.6 | 2 | 8.9 | 2.7 | 8 |
| Flexural modulus (kgf/cm²) | 280 | 330 | 270 | 278 | 172 |
| Gloss (%) | 97 | 105 | 103 | 103 | 48 |
| Image clarity (%) | 84.0 | 107.0 | 99.0 | 102.0 | 28.0 |
| Pencil hardness | H | H | F-H | F-H | HB-F |

| | Comparative example | | | |
|---|---|---|---|---|
| | 7 | 8 | 9 | 10 |
| Content of A component (wt %) | 50 | 50 | 100 | 30 |
| Content of B component (wt %) | 50 | 50 | — | 70 |
| Content of polysiloxanes (wt %) | 0.05 | 0.05 | — | 0.05 |
| Average rubber particle diameter ($\mu_m$) | 1 | 0.7 | 0.6 | 1.1 |
| Content of MMA in total resins (wt %) | 16.5 | 32.5 | — | 57.4 |
| Content of MMA in B component (wt %) | 33 | 65 | — | 82 |
| TI/rubber component | 3.8 | 1.1 | 1.8 | 2.8 |
| Average length of interface ($\mu_m/\mu_m^2$) | 7.3 | 1.9 | — | 1.1 |
| Izod impact strength (kgfcm/cm) | 6.9 | 3.2 | 3.1 | 2.7 |
| Flexural modulus (kgf/cm²) | 180 | 235 | 220 | 265 |
| Gloss (%) | 80 | 95 | 101 | 97 |
| Image clarity (%) | 51.0 | 79.0 | 102.0 | 84.0 |
| Pencil hardness | F | F-H | 4B-3B | F-H |

TABLE 1-continued

| | Example | | | |
|---|---|---|---|---|
| | 5 | 6 | 7 | 8 |
| Content of A component (wt %) | 70 | 50 | 40 | 50 |
| Content of B component (wt %) | 30 | 50 | 60 | 50 |
| Content of polysiloxanes (wt %) | 0.05 | 0.05 | 0.05 | 0.05 |
| Average rubber particle diameter ($\mu_m$) | 0.58 | 0.58 | 0.58 | 1.2 |
| Content of MMA in total resins (wt %) | 9.9 | 16.5 | 23.1 | 16.5 |
| Content of MMA in B component (wt %) | 33 | 33 | 38.5 | 33 |
| TI/rubber component | 1.7 | 1.7 | 1.7 | 2.8 |
| Average length of interface ($\mu_m/\mu_m^2$) | 4.2 | 7.2 | 5.6 | 7.1 |
| Izod impact strength (kgfcm/cm) | 10.4 | 8.8 | 6.3 | 8.5 |
| Flexural modulus (kgf/cm²) | 234 | 260 | 275 | 250 |
| Gloss (%) | 100.2 | 101 | 102 | 98 |
| Image clarity (%) | 94.2 | 95.1 | 95.9 | 85.9 |
| Pencil hardness | HB | F | F-H | F |

| | Comparative example | | | | |
|---|---|---|---|---|---|
| | 11 | 12 | 13 | 14 | 15 |
| Content of A component (wt %) | 100 | 95 | 20 | 50 | 30 |
| Content of B component (wt %) | — | 5 | 80 | 50 | 70 |
| Content of polysiloxanes (wt %) | — | 0.05 | 0.05 | 0.05 | — |
| Average rubber particle diameter ($\mu_m$) | 0.58 | 0.58 | 0.58 | 2.7 | 0.58 |
| Content of MMA in total resins (wt %) | — | 3.3 | 26.4 | 16.5 | 57.4 |
| Content of MMA in B component (wt %) | — | 66 | 33 | 33 | 82 |
| TI/rubber component | 1.7 | 1.7 | 1.7 | 3.2 | 2.8 |
| Average length of interface ($\mu_m/\mu_m^2$) | — | 0.2 | 2.8 | 6.9 | 1.1 |
| Izod impact strength (kgfcm/cm) | 15 | 10.5 | 2.6 | 8 | 2.7 |
| Flexural modulus (kgf/cm²) | 200 | 207 | 305 | 220 | 265 |
| Gloss (%) | 100 | 99.5 | 102 | 65 | 94 |
| Image clarity (%) | 92.6 | 90.1 | 96.7 | 27.6 | 85.9 |
| Pencil hardness | 4B-3B | 3B | H | HB-F | F-H |

[Evaluation of platability with metals]

The rubber-modified styrenic resin composition obtained in Example 4 was injection-molded to give a specimen (120×60×3 mm). The specimen was subjected to a combination of a treatment for chemical roughening of the surface with an etchant based on sulfuric acid/chromic acid and a treatment for providing polarity with a conditioner, similar to the pretreatment normally applied to the surface of articles molded from ABS resins, and the pretreated specimen was subjected to chemical plating (electroless plating) by adding sodium hypophosphite to an aqueous solution containing copper ions and heating the specimen in the solution at 90 to 100° C. to form a lower layer of copper with a thickness of 1 μm, and then subjected to similar chemical plating (electroless plating) by using an aqueous solution containing nickel ions to form a top layer of nickel with a thickness of 0.25 μm.

The specimen thus plated was glossy over the whole surface with no exposure of the resin layer beneath the coat of metals, that is, with none of the so-called skip. When the tape test (ASTM D3359 without cross-cut) was run on the specimen, no peeling of the metal coat was observed and a good surface was maintained.

INDUSTRIAL APPLICABILITY

Rubber-modified styrenic resin compositions of this invention excel not only in surface characteristics such as appearance and scratch resistance but also in mechanical characteristics such as impact resistance and rigidity and are well balanced in these characteristics. They are scratch-resistant while uncoated and are suitable as injection molding materials for electrical, electronic, office and communication equipment. In addition, articles molded from rubber-modified styrenic resin compositions of this invention exhibit excellent platability with metals and allow the formation of a metal film on their surface with high adhesive strength. In particular, such molded articles can be given properties required for electromagnetic shields by chemical plating (electroless plating) and the plated articles are best suited for housings of office equipment.

What is claimed is:

1. Rubber-modified styrenic resin composition, comprising:

90 to 30% by weight of rubber-modified styrenic resins (A) containing rubbery polymer particles dispersed in the phase of styrenic polymers (C), said rubbery polymer particles having an average particle diameter of 0.3 to 2.0 μm; and 10 to 70% by weight of styrene-(meth)acrylate ester copolymer resins (B), wherein in said rubber-modified styrenic resin composition:

(1) the content of (meth)acrylate ester units is 5 to 50% by weight based on the total weight of the composition, and (2) the ratio of % by weight of toluene-insolubles to % by weight of rubber component is in the range from 1.2 to 3.5.

2. Rubber-modified styrenic resin compositions as described in claim 1 wherein said styrenic polymers (C) constituting the continuous phase of rubber-modified styrenic resins (A) and said styrene-(meth)acrylate ester copolymer resins (B) are dispersed in a semi-compatible state and the average length of the interface between the phase of styrenic polymers (C) and that of styrene-(meth) acrylate ester copolymer resins (B) in said resin compositions is 2.5 μm or more per 1 square μm.

3. Rubber-modified styrenic resin compositions as described in claim 1 wherein said resin compositions contain 0.005 to 0.5% by weight of polysiloxanes with a surface tension of 19.0 to 22.0 dynes/cm at 25° C.

4. Rubber-modified styrenic resin compositions as described in claim 1 wherein the average particle diameter of dispersed rubbery polymers is in the range from 0.4 to 0.9 μm, the proportion of rubber particles of a salami-like structure is 80% by weight or more of the total dispersed rubbery polymer particles and the number of dispersed rubbery polymer particles each occluding 20 or less styrenic polymer particles is 70% or more of the total number of dispersed particles.

* * * * *